E. P. WEBSTER.
WHEEL HUB.
APPLICATION FILED JUNE 23, 1917.
1,345,648.
Patented July 6, 1920.
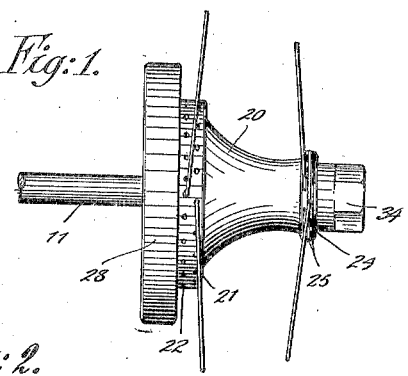
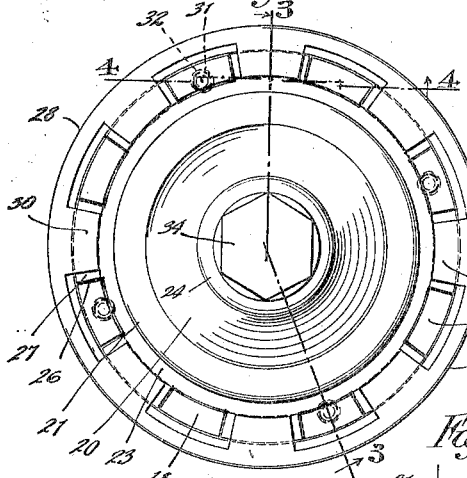
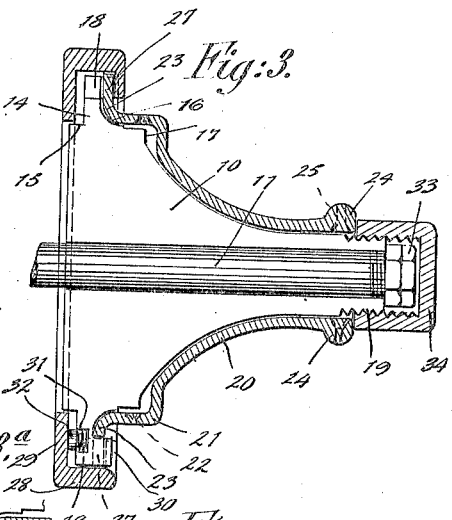
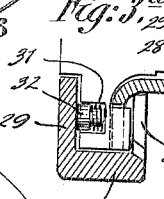
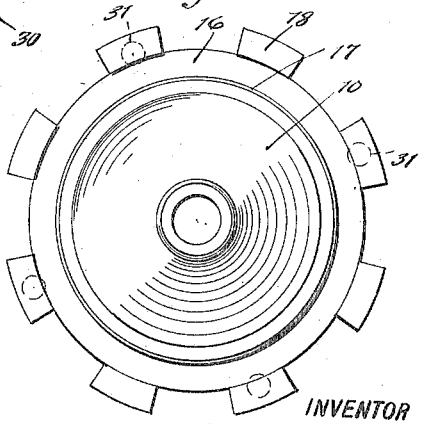
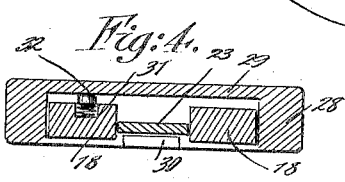
INVENTOR
Edgar P. Webster
BY
ATTORNEY

UNITED STATES PATENT OFFICE.

EDGAR P. WEBSTER, OF BRIDGEPORT, CONNECTICUT.

WHEEL-HUB.

1,345,648.  Specification of Letters Patent.  Patented July 6, 1920.

Application filed June 23, 1917. Serial No. 176,496.

*To all whom it may concern:*

Be it known that I, EDGAR P. WEBSTER, a citizen of the United States, and resident of Bridgeport, in the county of Fairfield and State of Connecticut, have invented certain new and useful Improvements in Wheel-Hubs, of which the following is a specification.

The present invention relates to improvements in wheel hubs, and particularly such hubs either for the front or driving as are used with wire wheels for motor vehicles, the general objects of my invention being to provide such a hub by means of which the operation of mounting and demounting will be greatly simplified and facilitated, permitting the quick change of the wheel with a minimum removal or adjustment of parts; at the same time, providing in such a hub safety retaining or connecting means to prevent the accidental disengagement of the wheel from the axle hub. Another object is to provide such a wheel in which there will be no open parts for the lodgment of dust.

I am aware that there are wheels on the market, and a number of patents have been granted therefor, in which means are provided for preventing the accidental disengagement of the hub, but these have depended for the most part upon the movement of the wheel after loss of the main holding means, into an abnormal position, whereupon the wheel engages further auxiliary holding means. In the present invention I propose to provide a wheel hub in which the auxiliary holding means is always in operation, and does not depend upon the movement of the wheel from its normal running position to be made operative. In my improved hub, I also provide means for quickly demounting the wheel. This means, however, only becomes active while the wheel is stationary, so that any accidental force exerted upon the wheel while running, similar to that employed in demounting the wheel, will not avail to disengage the same.

A further object of the invention is to provide such a hub in which any torsional strains on the wheel will be compensated to the end that there will be no straining or mutilation of the parts, and in which the locking parts are preferably at the largest peripheral portion of the hub so that there is little strain thereon.

A still further object of the invention is to provide such a hub which may be formed from simple dies, and by comparatively simple and inexpensive manufacturing processes, so that an inexpensive, and at the same time thoroughly efficient and durable hub is produced.

With these and other objects in view, an embodiment of my invention is shown in the accompanying drawings, and this embodiment will be hereinafter more fully described with reference thereto, and finally pointed out in the claims.

In the accompanying drawings,

Figure 1 is a side elevation of a wire wheel hub, embodying my improvements;

Fig. 2 is a front view thereof;

Fig. 3 is a sectional view along the line 3—3 of Fig. 2;

Fig. 3ª is a fragmentary sectional view, enlarged, showing the position of the parts to permit of removal of the hub;

Fig. 4 is a sectional view along the line 4—4 of Fig. 2;

Fig. 5 is a front view of the wheel or outer hub; and

Fig. 6 is a similar view of the axle or inner hub.

Similar reference characters indicate corresponding parts throughout the several figures of the drawings.

Referring to the drawings, the illustrative embodiment of my invention which I have shown therein, comprises a permanent inner or wheel hub 10, rotatable upon the axle shaft 11, anti-friction bearings (not shown), of any suitable type being disposed between the hub and the axle. With the rear wheels, the inner face 13 of the hub is suitably connected to the driving mechanism, as will be understood.

The hub 10 is tapered toward its outer end, and at its enlarged inner portion is provided with a circumferential flange 14, offset at the rear as at 15, and provided at the face side with a seat 16, which terminates in a shoulder 17. A plurality of radial extensions 18 are provided upon the periphery of the flange 14, providing radially disposed recesses therebetween, of a slightly greater annular width than the width of the extensions. The rear faces of the extensions are substantially flush with the flange 14, while the front face is raised therefrom, as clearly shown in Figs. 3 and 3ª. The front reduced end of the inner hub is provided with screw threads 19.

The outer member or shell 20, which carries the wire spokes and the felly of the wheel, is tapered to fit over the inner hub, and is provided at its inner portion with a shoulder 21 which has openings 22 therein in which are secured the nippled ends of the wire spokes, and a flange 23 extends from the said shoulder. At the outer reduced end of the wheel hub a flange 24 is provided having openings 25 therein, which are also engaged by the nippled ends of the spokes. The flange 23 is provided with a plurality of cut out portions 26 of such size as to engage the extensions 18 of the hub providing radial extensions 27 which fit between the said extensions 18, and which extensions 27 are of greater width than the extensions 18. When the member 20 is thus seated on the inner hub, the raised front face of the extensions 18 extends above the surface of the flange 23, so that the same form stop lugs, as hereinafter more fully pointed out.

A retaining member comprising a ring portion 28, is provided at one side with an inwardly extending flange 29, and at its other side with inturned lugs 30, corresponding in size to the extensions 18 of the member 20, the radial depth of the spaces between the extensions 18 extending slightly within the inner edge of the lugs 30, so as to permit of engagement of the wheel hub in the ring, and the turning of the extensions 18 beneath the lugs. A plurality of recesses 31 are provided in the under side of the hub 10, in which are disposed spring pressed blocks 32, which engage the flange 29, and force the ring inwardly.

In order to mount the member 20, the same is seated upon the hub 10, the extensions 27 thereof being engaged in the spaces between the lugs 30 of the retaining ring, and the extensions 18 of the hub. In this position the member 20 is free to be moved outwardly, and the upper surfaces of the extensions 27 are slightly below the under surfaces of the lugs 40. The retaining ring is now turned with respect to the hub 10 and member 20, or the same may be turned with respect to the ring, until the extensions 18 of the hub become exposed at the spaces between the lugs 30, whereupon the spring pressed blocks 32 force the ring inwardly until stopped by engagement of the extensions 27 with the lugs 30, so that the extensions 18 constitute abutments between the lugs, as clearly indicated in Figs. 2 and 3, which prevent rotation of the ring with respect to the hub and member 20, the ring at the same time firmly locking the same together.

A double lock-nut 33 is secured upon the end of the axle shaft 11, and a cap 34 is mounted over this upon the threaded end 24 of the hub 10, which extends beyond the extremity of the member 20.

The wheel may be quickly demounted by removing the cap 34, and forcing the ring toward the outer end of the hub, compressing the spring blocks 32, and bringing the extensions 18 into a plane beneath the under surface of the lugs 30, whereupon the hub and member 20 may be turned with respect to the retaining ring, moving the extensions 18 of the hub 10 beneath the lugs 30, and the extensions 27 of the member 20 into the spaces between the lugs, permitting the removal of the wheel.

When the wheel is in place, any danger of accidental disengagement of the same from the hub by loss of the cap 34 is absolutely prevented, as the retaining ring securely holds the parts together, and as the ring turns with the hub, always maintains its operative relation therewith. Should a contingency arise while the cap is removed, whereby a force is exerted inwardly upon the hub, and the ring is held stationary so that the spring blocks are pressed inwardly and rotation of the hub with respect to the retaining ring is permitted, or vice versa, removal of the wheel will be prevented, as the extensions 18 of the hub 10 are of less width than the spaces between the lugs 30, and therefore always positively fall into interlocking relation therewith, while the extensions 27 of the member 20 fit snugly in the spaces between the said lugs 30 and being beneath the under surface of the lugs, are constantly moved beneath the same by the rotation of the wheel. The smallest engagement of the extensions 27 with the lugs 30, interlocks the hub and ring and member 20 securely together. It is absolutely essential before demounting of the wheel is possible, to have both the hub and member 20 and ring stationary, so that the extensions 27 may be brought into accurate register with the spaces between the lugs 30, after first removing the cap and compressing the retaining ring to the hub to release the abutment extensions 18, as above pointed out.

With my improved hub it will be seen, mounting and demounting of the wheel is greatly facilitated, and accidental loss of the wheel is effectually prevented. The hub is entirely closed, so that there can be no accumulation of dust therein. The disposition of strains, due to side force and weight, is such that the wheel always functions perfectly and wear on the parts is reduced to a negligible quantity.

I have illustrated a preferred and satisfactory embodiment of my invention, but it is obvious that changes may be made therein within the spirit and scope thereof, as defined in the appended claims.

I claim:

1. In a hub for detachable wheels, the combination of a wheel hub member, an outer member adapted to be engaged therewith, flanges on said members adapted to be interlocked to prevent rotation of said outer member with respect to said wheel hub member, retaining means adapted to engage said flanges to interlock said members to prevent axial movement thereof with respect to each other, said retaining means adapted to have a primary independent axial movement and a secondary independent circumferential movement relatively to said outer member.

2. In a hub for detachable wheels, the combination of a wheel hub member, an outer member adapted to be engaged therewith, means on said members adapted to coöperate to prevent the rotation of said outer member with respect to said wheel hub member, projecting means on said wheel hub member, a retaining ring adapted to be engaged with said members, means on said retaining ring adapted to coöperate with said projecting means on said wheel hub member to prevent longitudinal movement of said members with respect to each other, and to prevent rotation of said retaining ring with respect to said members, said retaining ring adapted to be moved longitudinally and circumferentially to permit removal of said outer member from said wheel hub member.

3. In a hub for detachable wheels, the combination of a wheel hub member, an outer member adapted to be engaged therewith, means on said members adapted to coöperate to prevent the rotation of said outer member with respect to said wheel hub member, projecting means on said wheel hub member, a retaining ring adapted to be engaged with said members, means on said retaining ring adapted to coöperate with said projecting means on said wheel hub member to prevent longitudinal movement of said members with respect to each other, and to prevent rotation of said retaining ring with respect to said members, yieldable means adapted to maintain said retaining ring in locking position with said members, said retaining ring adapted to be moved longitudinally and circumferentially by overcoming the force of said yieldable means to permit detachment of said outer member from said wheel hub member.

4. In a hub for detachable wheels, the combination of a wheel hub member, an outer member adapted to be engaged therewith, radial projections on said wheel hub member, radial projections on said outer member adapted to coöperate with said projection on said wheel hub member to prevent rotation of said outer member with respect thereto, a retaining ring adapted to be engaged over the projections on said members, projections on said retaining ring corresponding to the projections on said wheel hub member, said projections on said retaining ring adapted to be moved into engagement with the projections on said outer member to prevent longitudinal movement of said members with respect to each other, means adapted to positively prevent turning movement of said retaining ring in the engaged relation of said projection thereof with said projections of said outer member, said retaining ring adapted to be moved circumferentially to permit detachment of said outer member from said wheel hub member.

5. In a hub for detachable wheels, the combination of a wheel hub member, an outer member adapted to be engaged therewith, radial projections on said wheel hub member, radial projections on said outer member adapted to coöperate with said radial projections on said wheel hub member to prevent rotation of said outer member with respect to said wheel hub member, said projections of said wheel hub member extending above the projections of said outer member to form abutment means, a retaining ring adapted to be engaged over the projections of said members, projections on said retaining ring corresponding to the projections of said wheel hub member, yieldable means adapted to permit longitudinal movement of said wheel hub member with respect to said retaining ring, said projections of said retaining ring adapted to be moved over the projections of said outer member to prevent longitudinal movement of said members with respect to each other, said abutment means adapted to engage the end extremities of said projections of said retaining ring to prevent rotation of said ring with respect to said members, said retaining ring adapted to be moved longitudinally and circumferentially by overcoming the force of said yieldable means to disengage said projections of said outer member from said projections of said retaining ring, to permit detachment of said outer member from said wheel hub member.

6. In a hub for detachable wheels, the combination of a wheel hub member, an outer member adapted to engage said wheel hub member, means adapted to prevent relative turning movement of said members in their engaged relation, and rotatable retaining means adapted to be rotated into locking relation with said members to prevent axial movement of said members relatively to each other, said retaining means being yieldable axially independently of said rotation to permit of said rotation of said retaining means.

In testimony that I claim the foregoing as my invention I have signed my name in presence of two subscribing witnesses.

EDGAR P. WEBSTER.

Witnesses:
MOE. M. WEINBERG,
H. N. STUART.